United States Patent [19]

Winch

[11] 4,045,852

[45] Sept. 6, 1977

[54] WHEEL TRUING MACHINE

[75] Inventor: Andrew Gordon Winch, Nottingham, England

[73] Assignee: Raleigh Industries Limited, Nottingham, England

[21] Appl. No.: 598,038

[22] Filed: July 22, 1975

[30] Foreign Application Priority Data

July 24, 1974 United Kingdom .............. 32595/74

[51] Int. Cl.² ............................................. B21K 1/34
[52] U.S. Cl. .................................. 29/159.02; 157/1.5
[58] Field of Search ...................... 29/159.02; 157/1.5, 157/1.55

[56] References Cited

U.S. PATENT DOCUMENTS

| 607,718 | 7/1898 | Wagner | 157/1.5 |
| 1,357,056 | 10/1920 | House, Jr. | 157/1.5 |
| 1,609,282 | 12/1926 | Ash | 29/159.02 |
| 1,622,268 | 3/1927 | Ash | 29/159.02 |
| 3,294,145 | 12/1966 | Basset | 157/1.5 |
| 3,758,931 | 9/1973 | Patterson | 29/159.02 |
| 3,789,475 | 2/1974 | Barwell | 29/159.02 |
| 3,841,379 | 10/1974 | Kinney | 29/159.02 X |

*Primary Examiner*—Victor A. DiPalma
*Attorney, Agent, or Firm*—Lackenbach, Lilling & Siegel

[57] ABSTRACT

A method of truing a newly built spoke wheel having a hub and rim, subsequent to fitting spokes to the wheel and loosely screwing nipples to the spokes at the wheel rim. The method comprises securing the rim and hub in a concentric relationship, locally depressing the rim relative to the hub to a datum radius in the region of a nipple, tightening said nipple at least partially, and further locally depressing said rim relative to said hub in the region of each of said remaining nipples until all of said nipples are tightened as desired.

10 Claims, 19 Drawing Figures

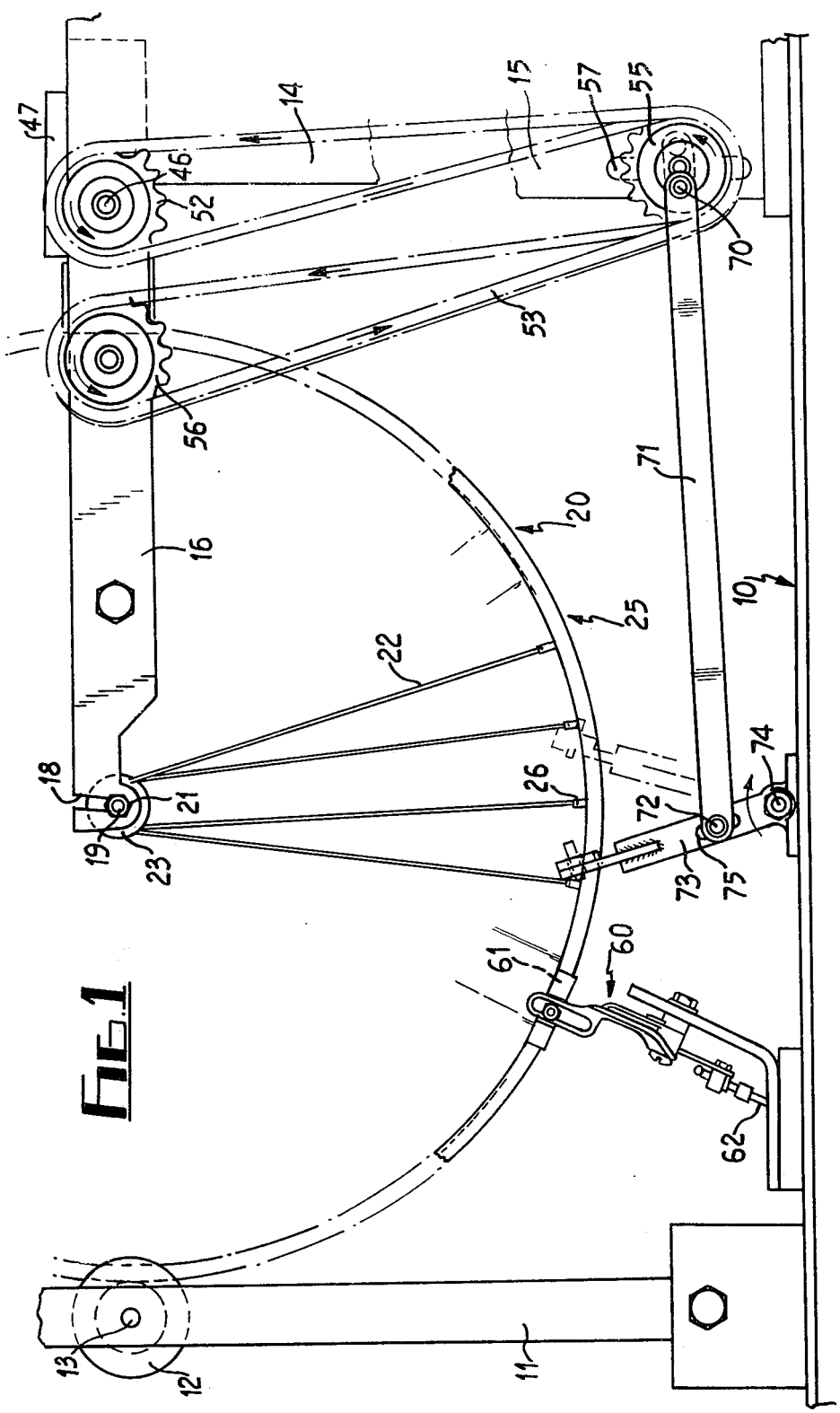

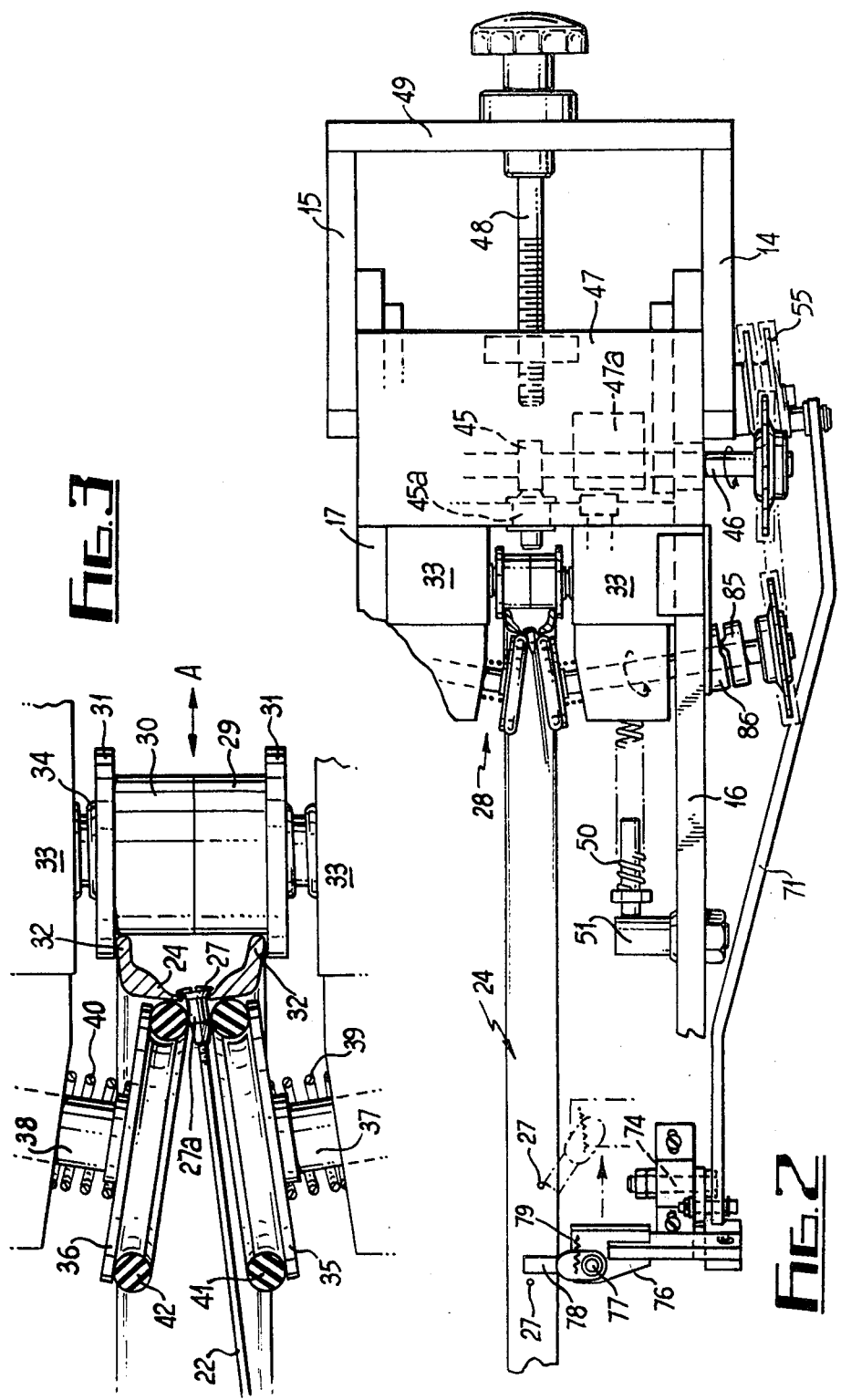

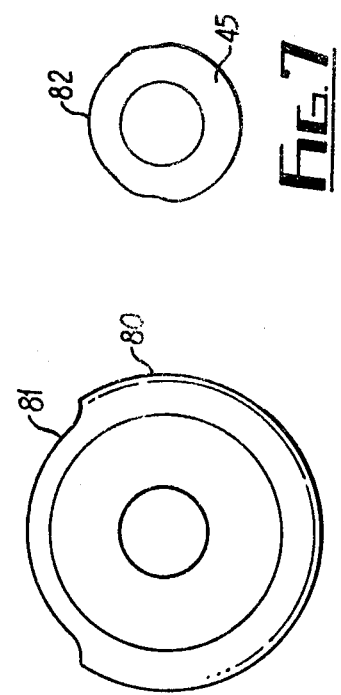
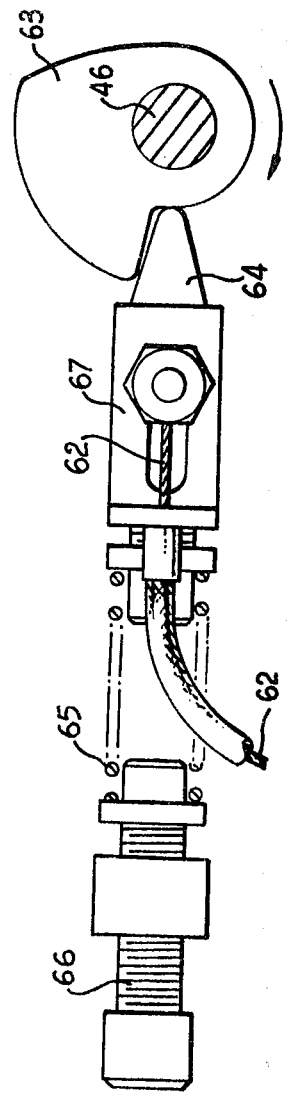
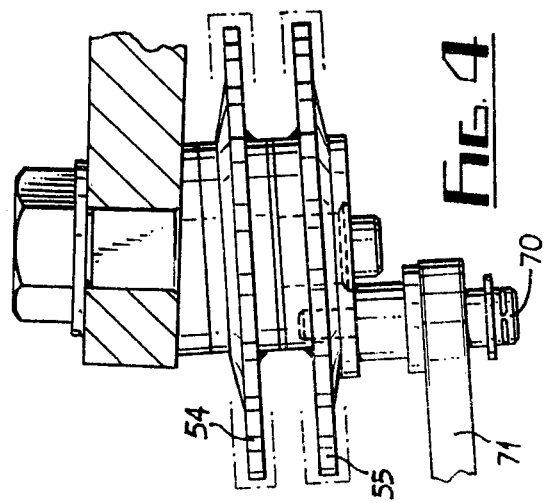

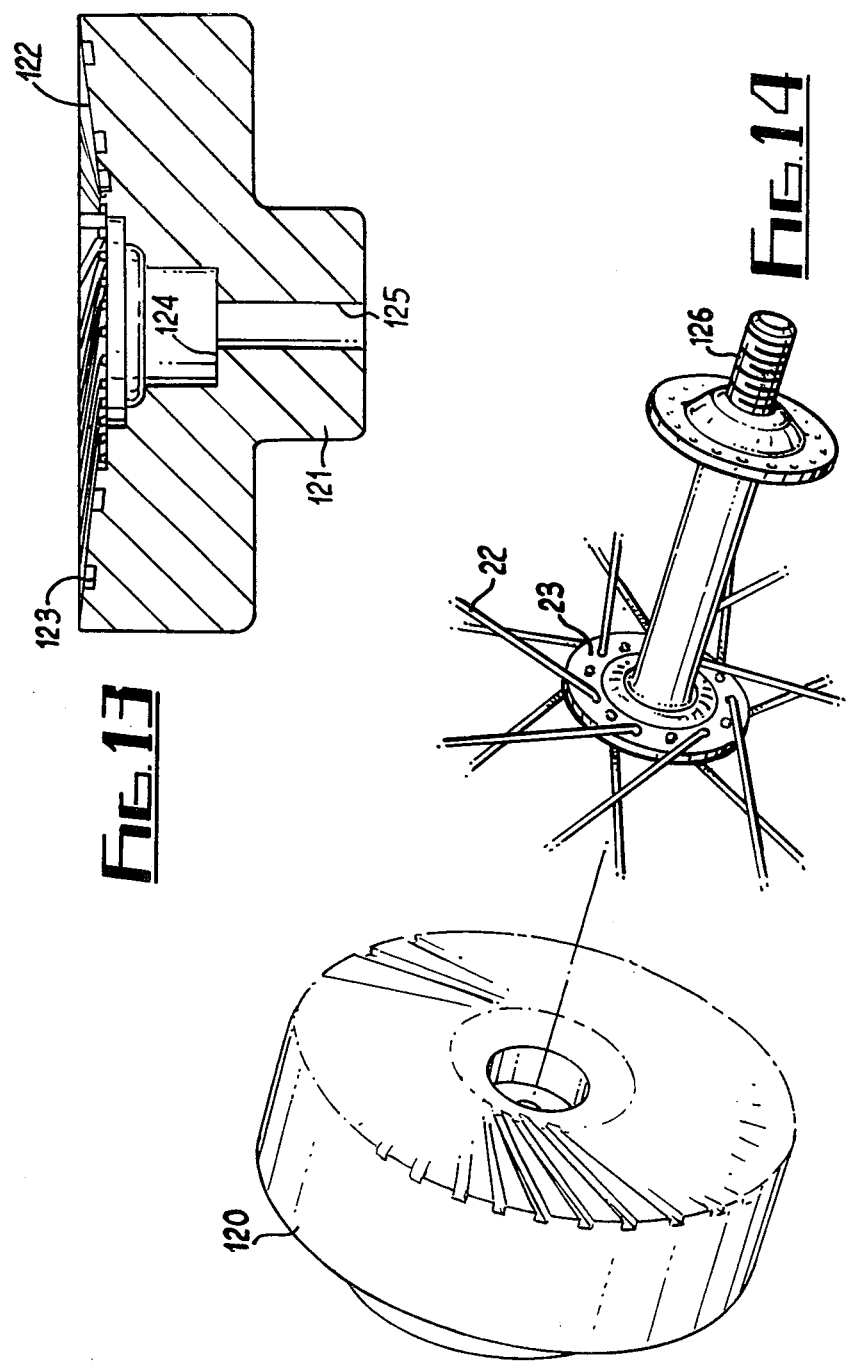

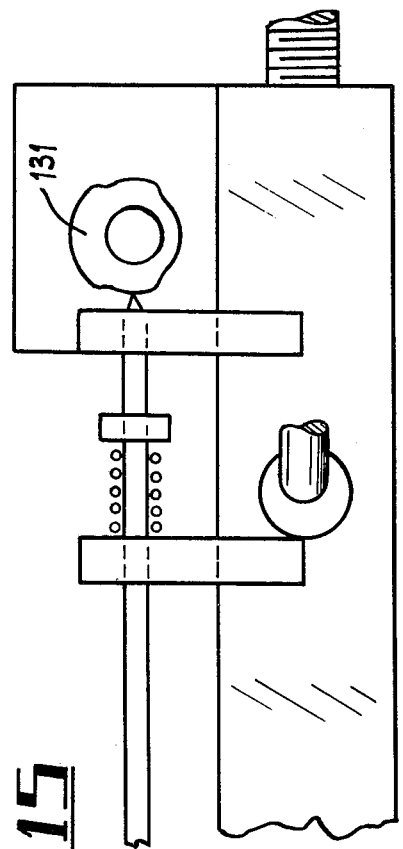
FIG. 15
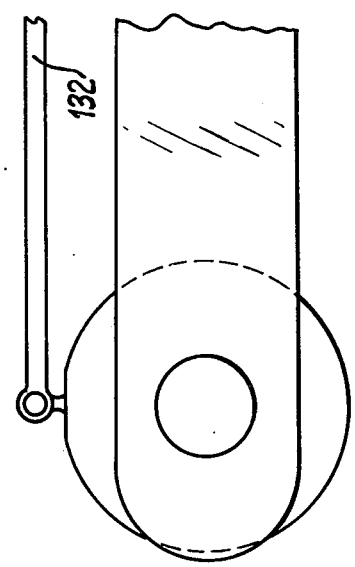
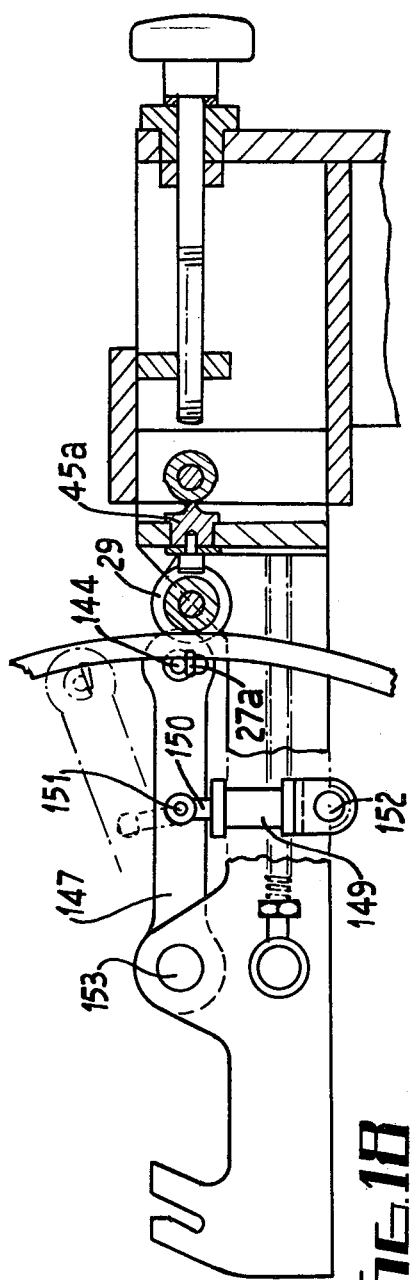
FIG. 18

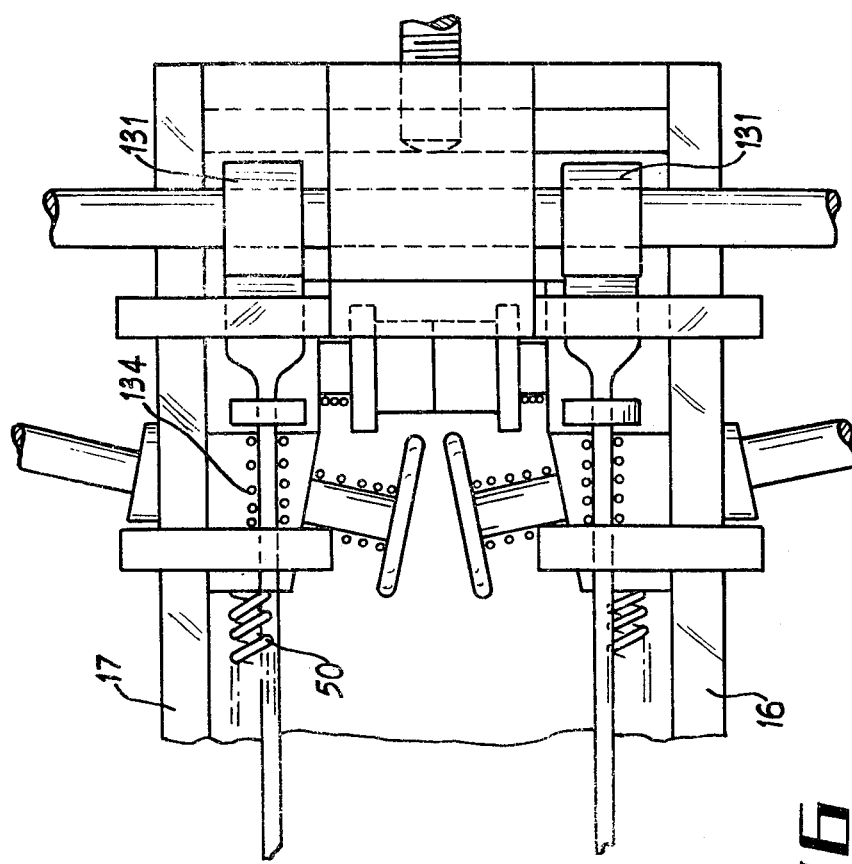
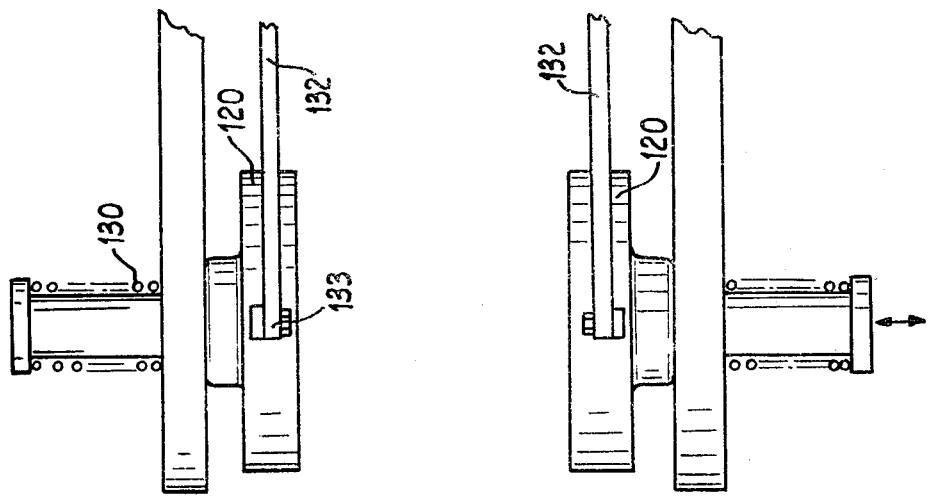
FIG. 16

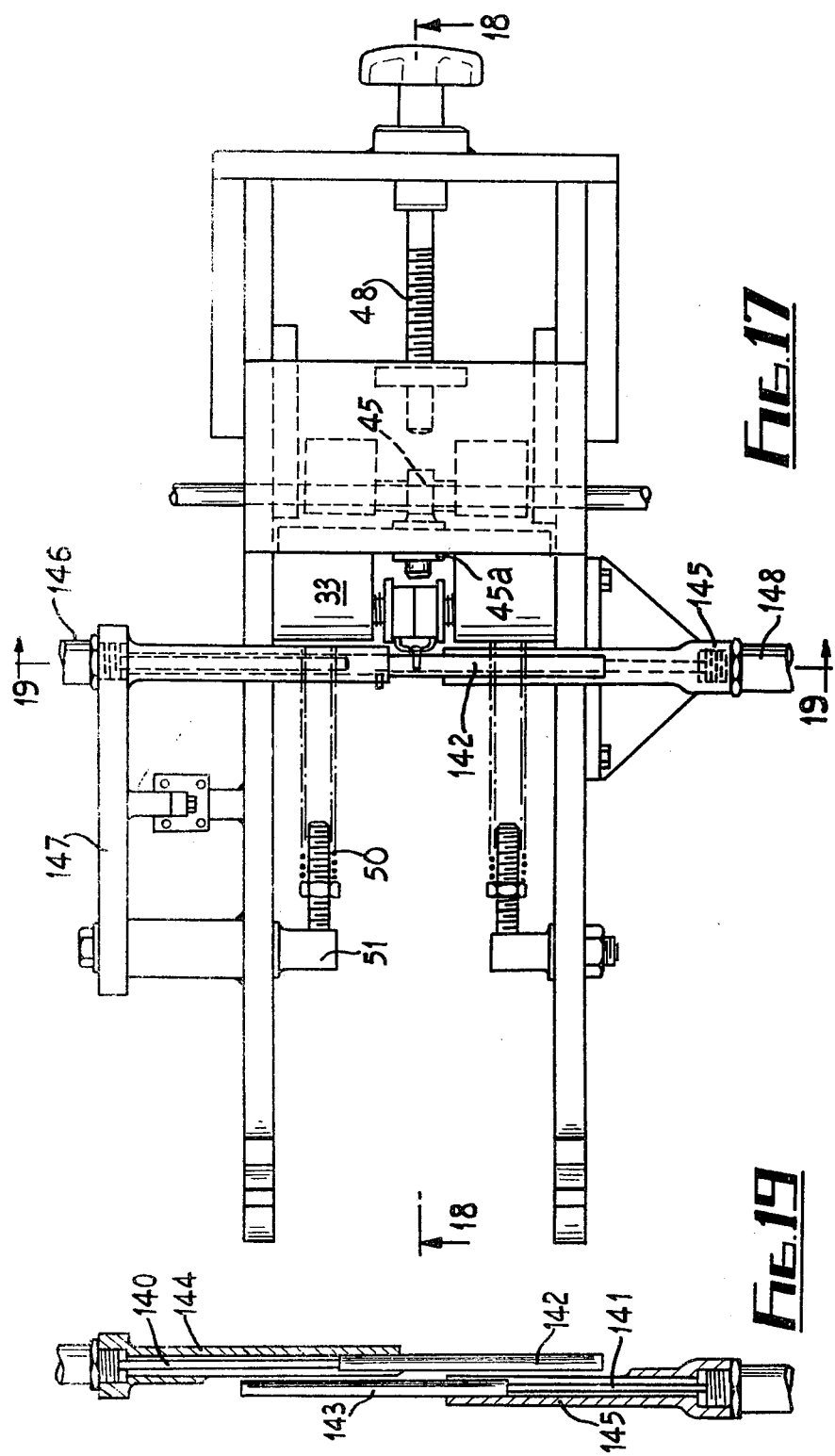

WHEEL TRUING MACHINE

BACKGROUND OF THE INVENTION

This invention relates to the truing of spoked wheels, particularly but not exclusively to the turning of spoked wheels for pedal cycles and other bicycles, tricycles, mopeds and the like.

One of the problems associated with the assembly and truing of spoked wheels lies in the correct tensioning of the spokes to produce a wheel which will run true to a desired extent.

In the past wheel truing has been carried out manually. The rim, hub, spokes and nipples are first loosely assembled by a wheel builder. From the builder, the wheel passes to the truer who uses his experience to tighten the nipples to a certain extend to produce a satisfactory wheel. Generally speaking, wheels of the same batch reaching the truer from the builder will need to have substantially the same corrective actions carried out on them and once the truer has produced one satisfactory wheel from a given batch he can usually fairly quickly work his way through the remaining wheels of a batch. When the truer feels that a wheel is satisfactory he checks its eccentricity and any rim deviations from the plane of the wheel on a machine specially provided for that purpose and then carries out final adjustments to the wheel to correct deviations revealed by the machine.

This method of wheel truing is expensive in both skilled labor and time.

SUMMARY OF THE INVENTION

According to one aspect of the invention a method of truing a spoked wheel subsequent to fitting spokes to the wheel and loosely screwing nipples to the spokes at the wheel rim comprises the steps of locally constraining the rim to a datum radius in the region of a nipple, tightening the nipple at least partially, and repeating with other nipples until the nipples are tightened as desired.

One embodiment comprises the steps of applying a force to locally depress the rim in the region of a nipple and rotating the nipple to tighten the nipple on the spoke until the nipple engages the rim whilst the rim is locally depressed, releasing the force, and repeating these steps with nipples around the wheel until each nipple has been tightened.

The nipples may be tightened in angular sequence, for example.

The nipple may be rotated by engagement with moving bands, for example wheels, which may engage opposite sides of the barrel of the nipple, the arrangement being such that the wheels slip on the nipple after the nipple has been rotated into engagement with the rim.

The force may be applied by a truing head, means being provided to cause relative movement between the truing head and the rim to move the head towards and away from the rim through a datum position, means being provided to cause relative movement between head and wheel to bring successive nipples into position for tightening. Preferably the truing head is moved through the datum position and the wheel is indexed past the head.

In one arrangement the nipples may be caused to protrude from the wheel rim by angularly rotating the hub in relation to the rim.

The nipples may be caused to protrude from the wheel rim by axially offsetting the hub in relation to the rim.

According to another aspect of the invention, the apparatus for truing a spoked wheel comprises means for locally constraining the rim to a datum radius in the region of a nipple, means for tightening the nipple, and means for causing relative movement between the wheel and tightening means to bring another nipple into position to be tightened.

In a preferred arrangement the relative movement is obtained by indexing the wheel past the tightening means, but the relative movement could be obtained by moving the truing head.

One embodiment comprises releasable force applying means for locally depressing the wheel rim in the region of a nipple on a spoke, means for rotating the nipple to tighten it into engagement with the rim while the rim is locally depressed, and means for rotating the wheel to enable the rim to be locally depressed in the region of successive nipples.

The force applying means may comprise a truing head, and means for moving the truing head towards and away from the rim. Preferably an abutment, for example a roller, is provided against which the rim abuts during operation of the truing head. Preferably there is also provided means for clamping the wheel hub to assist in providing said constraint.

The truing head may include endless members engageable with the nipple, and means for moving the endless members to rotate, and thus tighten, the nipple.

The endless means may comprise endless bands, or wheels. The wheels may be provided with a surface of friction material such as rubber.

When the nipple has been tightened into engagement with the rim, the endless means will slip on the nipple.

Preferably the endless means engage opposite sides of the barrel of the nipple.

The endless means may engage the wheel rim so that the wheel may be indexed by movement of the endless means.

In another arrangement the means for tightening the nipples comprises two shafts engageable with the nipple and movable to rotate the nipple between them.

A brake may be provided for holding the wheel during operation of the truing head, the brake being releasable during the rotation of the wheel. Preferably an indexing mechanism is provided operable in timed sequence with the brake and the truing head to index the wheel to bring successive nipples into position for tightening.

The truing head may be adjustable in position to accommodate wheels of different diameters.

The truing head may include two rollers for engaging a wheel rim, and spring means for biasing the rollers towards each other.

BRIEF DESCRIPTION OF THE DRAWINGS

The invention may be performed in various ways and one specific embodiment with possible modifications will now be described by way of example with reference to the accompanying drawings, in which:

FIG. 1 is a side elevation of part of an apparatus for truing spoked wheels;

FIG. 2 is a top plan view of part of the apparatus of FIG. 1;

FIG. 3 is part of FIG. 2 on an enlarged scale;

FIG. 4 is a part section view on an enlarged scale of part of an indexing drive mechanism;

FIG. 5 is a side elevation of part of a brake mechanism;

FIG. 6 is an axial view of a nipple rotating wheel;

FIG. 7 is an axial view of another cam;

FIG. 13 is a diametral section of the bush of FIG. 12;

FIG. 14 is a perspective view showing a bush and wheel hub;

FIG. 15 is a side elevation of FIG. 16;

FIG. 16 is a view similar to FIG. 2 of another arrangement;

FIG. 17 is a view similar to FIG. 2 of a further apparatus;

FIG. 18 is a section on the line 18-18 of FIG. 17; and

FIG. 19 is a section on the line 19-19 of FIG. 17.

DESCRIPTION OF THE PREFERRED EMBODIMENT

Figure 8:
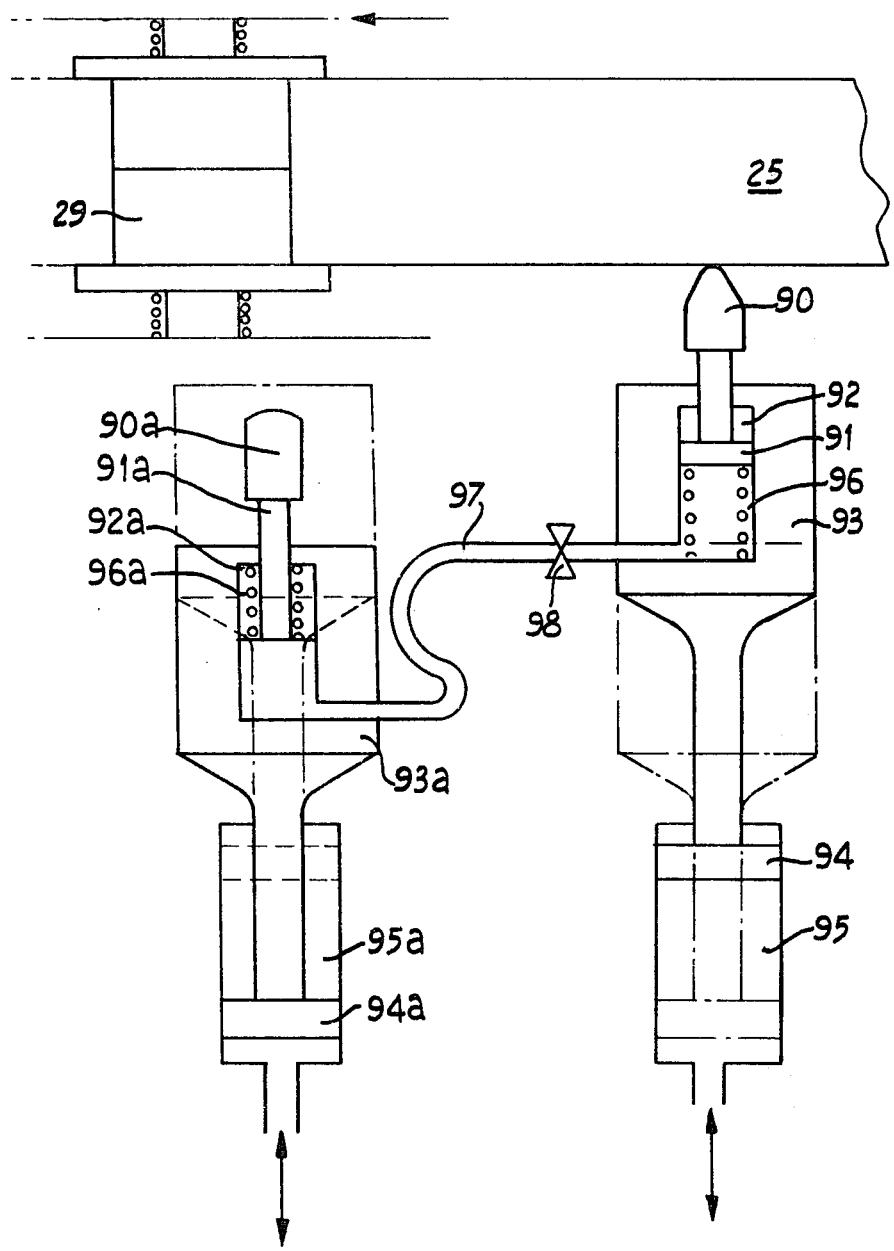
FIG. 8 is a schematic view of a side truth compensator.

Referring to the drawings, the method and apparatus of the invention is designed to true the spokes in a wheel, and sometimes the method is referred to as wheel truing. With this apparatus nipples are tightened on to all the spokes, and the spokes are all brought to substantially the same tension.

The apparatus comprises a sturdy frame having a horizontal support 10 and an upright pillar 11. The pillar 11 rotatably supports a wheel 12 on axle 13. Two laterally spaced plates 14, 15 extend upwardly from support 10 and are spaced from the pillar 11. Two parallel horizontal arms 16,17 are fixed respectively to the plates 14, 15 and extend towards the pillar and are formed with a downwardly extending slot 18 near their free ends. The slots 18 receive the ends of the axle 19 in the hub of a wheel 20 and the hub is firmly but releasable held in place by nuts 21 on axle 19. Of course the wheel and hub can rotate in relation to the axle. As is usual, spokes 22 extend from each of two flanges 23 (only one shown) on the hub to the central part 24 of a wheel rim 25 and are held in place by nipples 26, which are threaded on the ends of the spokes and are received in angularly spaced apertures in the central part 24 of the rim. In the fully assembled condition, the heads 27 of the nipples 26 engage the outer surface of the central rim part 24. In the position shown in FIG. 1, the wheel rim 25 engages the wheel 12 and a truing head 28. The truing head 28 is generally symmetrical about the wheel rim and comprises rollers 29, 30 each having a flange 31 at their outer end. The flanges 31 may respectively engage the axially outer surfaces of the flanges 32 on the wheel rim. The rollers 29, 30 can rotate on shafts extending from a main housing 33 and are biased towards each other by springs 34. The housing 33 is slidably located in guideways in arms 16, 17.

Grooved wheels 35, 36 are respectively fixed to shafts 37, 38 which can slide axially in housing 33 and are biased towards each other by springs 39, 40. The wheels 35, 36 clear the spokes 22 and respectively carry friction tires 41, 42 made from rubber or other suitable material.

The truing head 28 may be moved towards and away from the wheel rim, as indicated by arrows A, under the control of a cam 45 and cam follower 45a. The truing head is biased into contact with the cam 45 by springs 50 engaged on members 51 fixed to arms 16 and 17. The cam 45 is mounted on a main driving shaft 46 mounted in bearings 47a in housing 47 whose position can be adjusted by operating a lead screw 48 supported in cross member 49 fixed to the plates 14, 15.

The drive shaft 46 carries a sprocket wheel 52 at each end and an endless chain 53 extends round sprocket wheel 52, sprocket wheel 54, sprocket wheel 56 and sprocket wheel 55. The sprocket wheel 54 is adjustably mounted in a vertical slot 57 in plate 14 and is coaxial with wheel 55. Wheel 56 is fixed to shaft 37 for rotation of wheel 35. When 52 is mounted for horizontal adjustment in a slot in arm 16. A similar drive arrangement is provided for wheel 36 at the other side of the apparatus but omitting wheel 55.

A conventional caliper brake device 60 is secured on support 10 and includes two brake blocks 61 respectively engageable with the other surfaces of rim flanges 32. The brake is operated through a Bowden cable 62 under the control of a cam 63 mounted on the main driving shaft 46 cooperable with a cam follow 64 biased towards the cam by a spring 65 adjustable by screw 66. The cable 62 has a nipple at its end received in a member 67 fixed to the cam follower 64.

An indexing mechanism is provided to rotate the wheel step by step to bring successive spokes into operative position adjacent wheels 35, 36. The indexing mechanism comprises sprocket wheel 55 to which is eccentrically pivoted at 70 an arm 71 pivoted at 72 to another arm 73 one end of which is pivoted at 74 to the support 10. The pivot axis 72 can be adjusted in a slot 75 to accommodate different wheel sizes and different spoke spacings.

The arm 73 at its other end carries a support 76 (FIG. 2) to which is pivoted at 77 an arm 78 biased to the position shown in full line by a tension spring 79. As the sprocket 55 rotates clockwise, the support 76 is brought to the chain dotted position, the arm 78 during this movement being displaces by a spoke 22, then springing back into position behind the spoke, and then returning to the full line position during whicn movement the wheel is indexed through an angular distance of the space between two adjacent spokes.

The main driving shaft 46 is turned by a hand wheel (not shown).

The apparatus operates as follows.

The spokes are loosely assembled in the wheel with their nipples loosely threaded on their outer ends, the body or barrel 27a of the nipple extending through the respective aperture in the rim part 24. The wheel axle is secured in slots 18 with the rim engaging roller 12. The lead screw 48 is adjusted in respect of the wheel size. The indexing arm 78 is engaged behind a spoke, and the tires 41, 42 released into engagement with the nipple by mechanism described later. The truing head is moved into the operative position of FIG. 2 by rotating the drive shaft 46 so that cam 45 moves the head towards the wheel, through a datum position. The rollers 29, 30 engage the rim and cause the rim to be locally depressed or sprung in so that the nipple head is spaced from the rim part 24 and the nipple is not in frictional engagement with the rim. The barrel of the nipple is still received in its rim aperture. Rotation of the hand wheel then rotates the wheels 35, 36 in opposite directions so that the friction tires 41, 42, which engage the barrel of the nipple and also the wheel rim (FIG. 3), rotate the nipple until the head 27 of the nipple again engages the rim part 24 to establish frictional forces which cause the tires 41, 42 to slip on the nipple which is not tightened further. The tires contact the nipple for a predetermined part 80 FIG. 7 of their periphery, the remaining part 81 being relieved to enable the wheel 20 to be indexed. At the same time that relieved part 81 is operative the relieved peripheral part 82 of cam 45 is operative to allow springs 50 to move the truing head away from the operative position, through the datum position corresponding to the undepressed diameter of rim 20 and the pressure on the rim is released. Cam followers 85 (only one shown), cooperable with fixed cams 86 and respectively fixed on shafts 37, 38, pull the tires 41, 42 off the nipple and clear of the spokes. After this, continued movement of the driving shaft 46 operates the indexing mechanism to bring the next nipple into position for tightening. Prior to the operation of the indexing mechanism but after completion of the nipple tightening cam 62 releases the brake to allow the wheel 20 to be indexed; after completion of the indexing the brake is re-engaged and the indexing device returns to the full-line position. The cams 85, 86 then return the tires 41, 42 into engagement with the next nipple to be tightened and the whole cycle can be repeated.

By these means each nipple is tightened in turn.

The wheel during truing is held in a constraint comprising roller 12 and rollers 29, 30 whose relative positions are predetermined.

To achieve greater wheel accuracy, a "Side Truth" compensating mechanism can be incorporated for each roller 29 and 30. This is integral with the roller 29 and detects the magnitude and direction of side error in the rim, at the position of each nipple with reference to a datum. One suitable arrangement is shown in FIG. 8.

A stylus 90 for detecting error is connected to a piston 91 in a cylinder 92 in a slide device 93 which is integral with a piston 94 in a hydraulic cylinder 95. The slide 93 is shown in a forward position against a dead stop (not shown). A spring 96 biases the stylus 90 towards the side of the rim 25. A stylus 90a for compensating error is connected to similar parts 91a to 96a and the slide 93a is shown in a rearward position. The cylinders 92, 92a are connected by conduit 97 including a valve 98. If there is an error in the rim, the stylus 90 is depressed and oil flows from cylinder 92 through valve 98 into cylinder 92a to move the stylus 90a a proportional amount. The valve 98 is then closed, thus locking stylus 90a in position. If slide 93 is now retracted and slide 93a advanced to the forward position against the dead stop, the stylus 90a will engage the roller 29 and adjust the roller 29 axially. A similar mechanism is located on the other side of the appartus, for adjusting the roller 30. The slides are advanced and retracted manually and the compensation procedure is carried out before each nipple is tightened. In operation the mechanism detects the error and moves the rim a distance proportional to the error and in the opposite direction to the error. This has the effect of causing the nipples to protrude further, when the spoke is fastened to the flange on the opposite side of the hub to the direction of the error, and to protrude less when the spoke is fastened to the flange on the same side as the direction of the error. Therefore, nipples will be screwed on an amount related to the error existing in the spoked wheel, and not necessarily corresponding to the protrusion caused by the set-forward movement of the rollers 29, and 30.

It will be appreciated that the slides could be operated by suitable means rather than being operated manually; for example by a suitable mechanism operated in timed relationship to the wheel indexing means.

Figure 9:
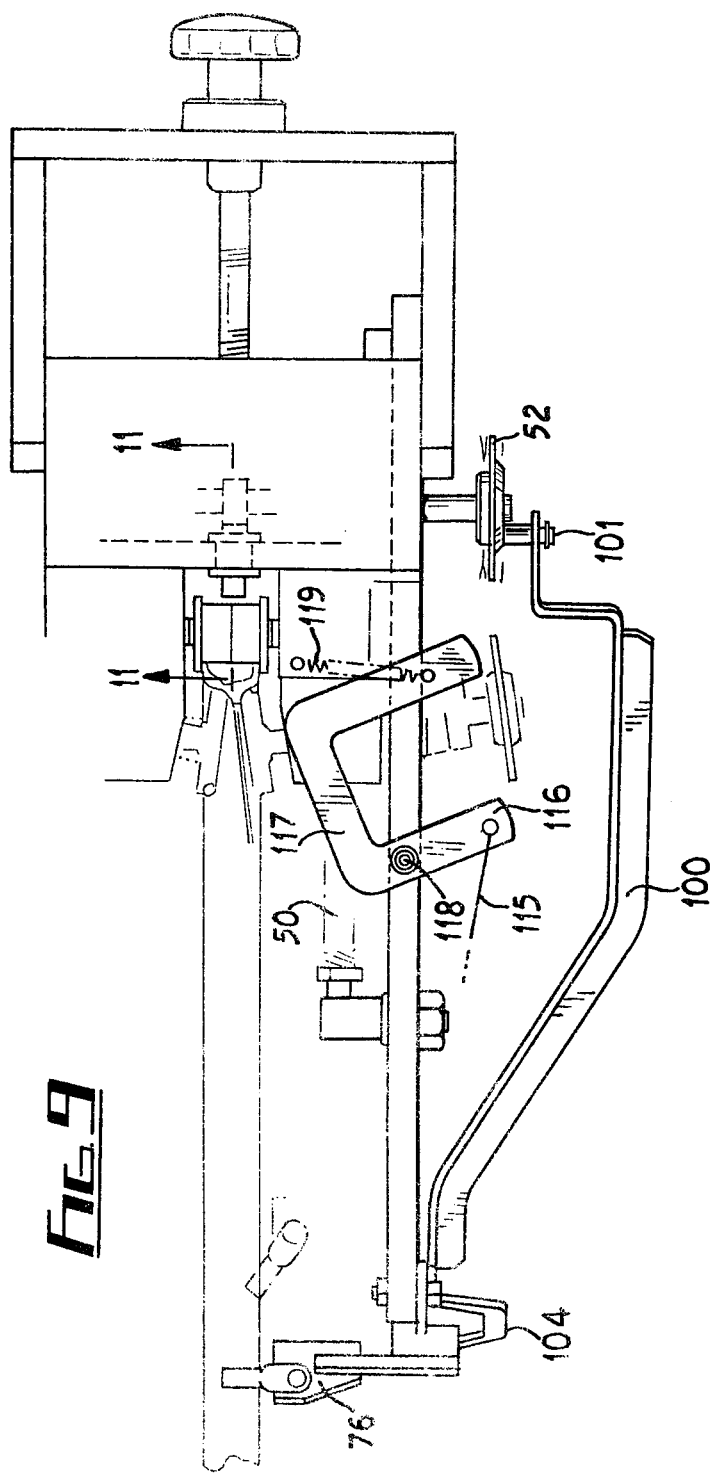
FIG. 9 is a view similar to FIG. 2 of a modified arrangement.
Figure 10:
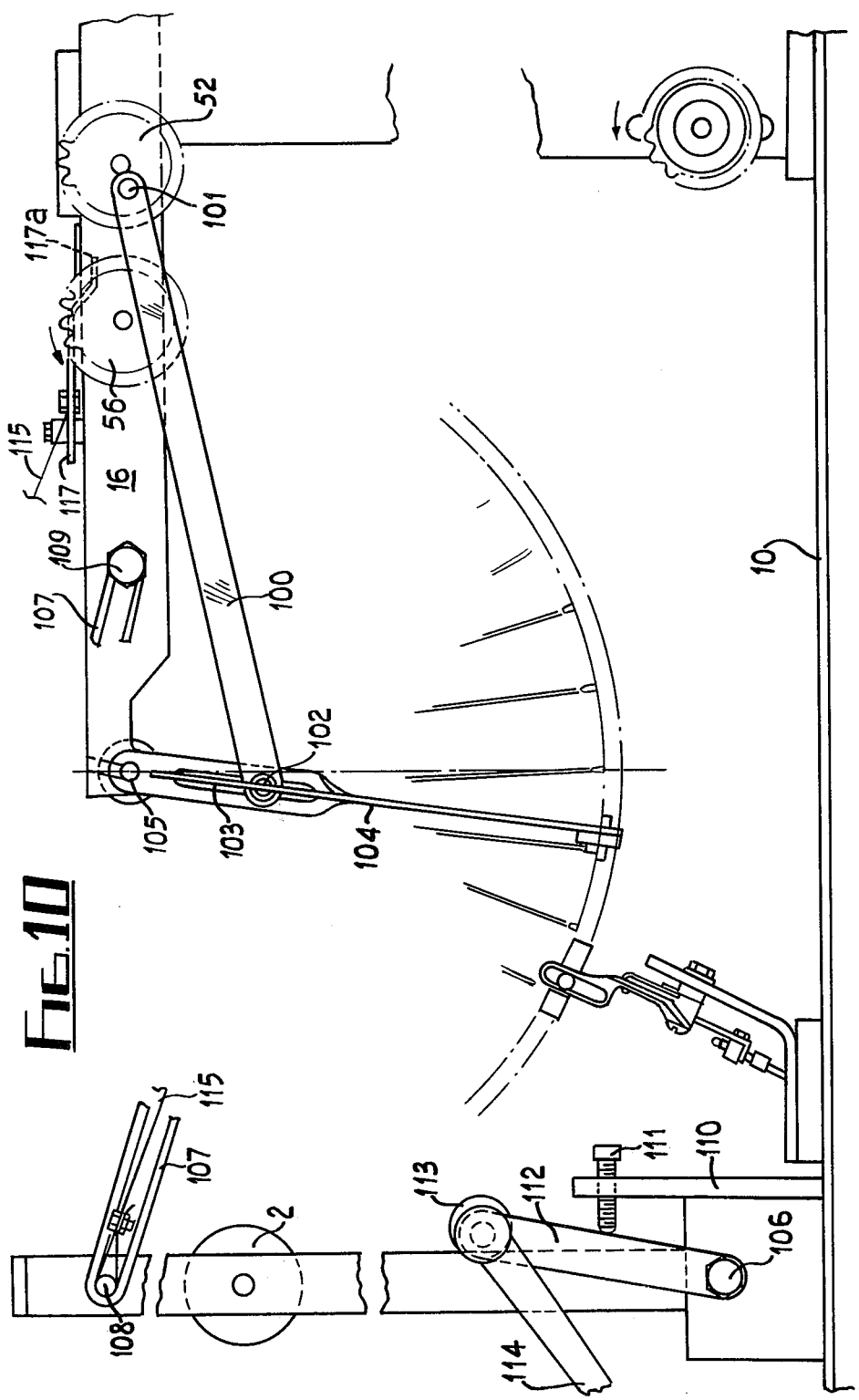
FIG. 10 is a side elevation of FIG. 9.
Figure 11:
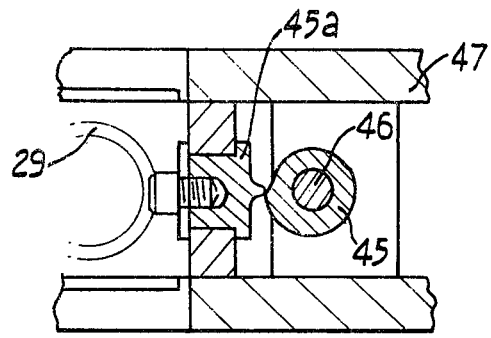
FIG. 11 is a section on the line 11—11 of FIG. 9.
Figure 12:
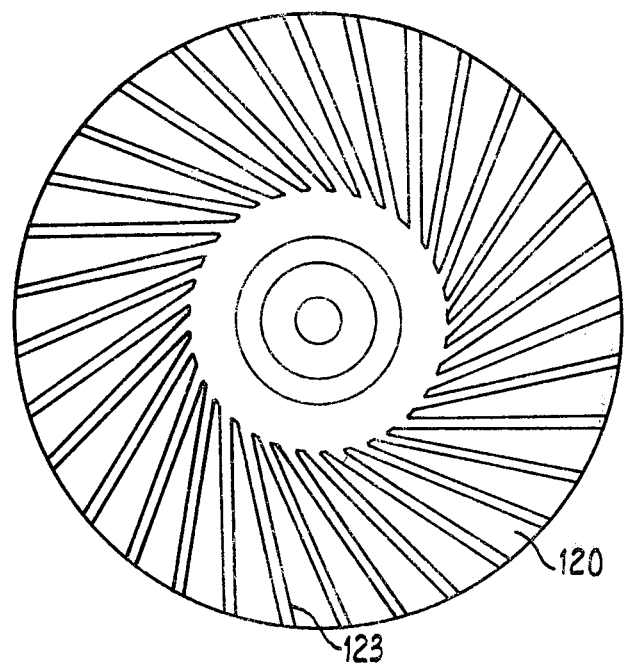
FIG. 12 is an end view of a spoke locating bush.

FIGS. 9 to 11 show a modified arrangement. This is generally similar to that of FIGS. 1 to 7 but with certain differences which will now be described. In this case the indexing mechanism comprises an arm 100 one end of which is eccentrically pivoted at 101 to sprocket 52 and the other end of which is pivoted at 102 on a pin which can slide in a slot 103 in an arm 104 extending radially from the base of slot 18 where it is pivoted at 105. At its outer end the arm 104 carries the support 76 and associated parts. On rotation of sprocket 52 the arm 104 moves angularly about pivot 105 to index the wheel.

In this arrangement the pillar 11 is pivoted to the support 10 at 106. Endless rubber bands 107 extend round pins 108, 109 fixed to pillar 11 and arm 16 or 17 to urge the roller 2 into engagement with the wheel rim.

An upstanding plate 110 is fixed to the support 10 and carries a threaded adjustment bolt 111 which engages an arm 112 pivoted at 106 to the support 10 and at the other end eccentrically pivoted to a cam 113 fixed to an operating arm 114 and engaging the pillar 11. A cable 115 extends between the pillar 11 and one end 116 of a U-shaped lever 117 pivoted at 118 to the arm 16. A similar cable extends from pillar 11 to another lever 117(not shown) on arm 17. A spring 119 extends between lever 117 and housing 33. Movement of handle 114 releases roller 2 from the wheel rim and operates lever 117 through cable 115. An offset portion 117a of lever 117 is thus brought into engagement with sprocket 56 to retract the wheel 35 from the wheel 20, and to disengage the cams 85, 86. This is done when a wheel is to be inserted into or removed from the apparatus. The spring 119 biases the lever 117 away from the sprocket 56. The cables 115 are somewhat slack when roller 2 engages wheel rim 25.

The invention is not restricted to the details set out above.

In place of the friction wheels or tires 41, 42 a screw driver can be used to tighten the nipples. The screw driver could be manually operated, or be driven by an electric motor or other means.

Alternatively, resilient endless bands passing over the head of the nipples can be used to rotate the nipples, for example using the apparatus described in United Kingdom patent application No. 39953/71 with suitable modifications.

In place of the cam 45 acting on the truing head to depress the rim, the nipples can be caused to protrude above the rim surface 24 by offsetting the hub axially, or rotating the hub angularly. In these cases the truing head is not used to locally depress the rim beyond a desired datum radius but forms a constraint, as described below, to remove ovality errors.

One apparatus for displacing the hub axially is described in United Kingdom patent application No. 39953/71. In the present case the hub would not be locked on fixed arms 16, 17, but would be adjustable between axial limit positions in relation to the truing head and to the support 10.

One apparatus for angularly rotating the hub in relation to the rim is shown in FIGS. 12 to 16. A hub location bush 120 is provided at each side of the wheel. The brush 120 is generally cylindrical with a reduced section stem 121 and its outer face has a shallow dish-shaped recess 122 provided with angularly spaced slots 123 which are tangential to a common circle. The brush 120 includes a central deeper recess 124 and axial bore 125 for receiving the axle 126. It will be observed that alternate spokes are on opposite sides of the respective flange 23. The outer spokes 22 are received in some of the slots 123.

Rotation of the bush 120 in one angular sense causes the nipples on half the spokes on each rim to protrude above the respective rim surface 24. For tightening the remainder, the bush is rotated angularly in the opposite sense to cause the remaining nipples to protrude. If the nipples are tightened one at a time in angular sequence, the bush is rotated alternately clockwise and anticlockwise.

The bush face 122 has four times as many slots as there are outer spokes which enables the wheel to be indexed one spoke at a time past the truing head whilst maintaining the bush in its angular position.

FIGS. 15 and 16 show the bushes 120 incorporated in an overall truing machine. Each bush 120 is biased towards the hub by spring 130. The bushes 120 are rotated the desired amount by cams 131 on the main drive shaft 46 acting on links 132 pivoted at 133 and biassed towards the datum, unrotated, position shown by springs 134. Means (not shown) are provided for withdrawing the bushes outwards as indicated by the arrows in FIG. 16 to allow the wheel to be indexed and to allow the wheel to be initially loaded into the apparatus.

Furthermore, although the described embodiment is mechanical, and the main drive shaft is rotated manually, the movements of the truing head, brake, indexer, wheels etc. can be effected through hydraulic, pneumatic or electrical means, or other mechanical means no described.

It will be appreciated that with the above arrangements, the truing head locally depresses the rim to a datum radius, measured from the hub. If the rim is not truly circular but has ovality errors, these are removed or substantially reduced, although there is a limit to the amount of error which can be compensated.

In the arrangements described above the nipples are tightened in angular sequence, each nipple being tightened once. Other methods are possible; for example it is possible to adjust the indexing mechanism so that every third or every fifth nipple is tightened and so on until all nipples are tightened. It will be appreciated that the indexing sequence may be different dependent on the number of spokes. Also it is possible to tighten the nipples in angular sequence, but to carry out two complete wheel rotations so that each nipple receives two tightening actions.

If the spokes are tensioned in strict angular sequence, each nipple being tightened once, a problem may occur in that the first few spokes to be tightened may be tightened excessively causing the wheel to be eccentric or oval, when all nipples have been tightened, particularly in the region of the first few spokes. This problem is overcome or reduced by having three revolutions of the wheel during the nipple tightening process. During the first revolution the truing head is not used and the wheel rim is not locally depressed. The tightening on this revolution results in the nipples being tightened up to rim face 24 with no tension in the spokes. During the second revolution the truing head is used but the lead screw 48 is adjusted to an intermediate position. The spokes thus become tensioned but not to the full desired amount. After the second revolution the screw 48 is adjusted to the final desired position and during the third revolution the truing head is used, resulting in the desired spoke tension.

However, more than three revolutions could be made, with partial tightening of the nipples at each revolution.

It will be understood that a second truing head could additionally be used, diametrically opposed to the first truing head. This would reduce the time required to true a wheel and reduce the possible error introduced by one revolution single spoke tensioning mentioned above.

In a further embodiment, the wheels or tires 41, 42 are used to index the wheel as well as tighten the nipples. To obtain indexing the cam 80 associated with that wheels or tires 41 or 42 which rotates in the indexing direction is not relieved at 81 so that frictional engagement between that wheel and the wheel rim will index the wheel 20.

FIGS. 17 to 19 show another form of apparatus which has some parts similar to that of FIG. 1. In this case the apparatus has two shafts 140, 141 which are circular in cross-section so as to have a flat surface and are provided with a surrounding sleeve of friction material, for example of hard rubber, which is segment-shaped in cross-section. Each of the sleeves 142, 143 thus has a flat surface for engaging the barrel of a nipple. The shafts 140, 141 are respectively supported in long bushes 144, 145 for stability. The flat surfaces of the sleeves engage the nipple barrel on opposite sides thereof.

A hydraulic cylinder 146 is fixed to a crank arm 147 and contains a piston fixed to the shaft 140. A hydraulic cylinder 148 is fixed to the machine and contains a piston fixed to the shaft 141. A supply of fluid to the cylinders causes the pistons to move, thus moving the shafts 140, 141 outwardly to rotate and tighten the nipple (the shaft 140 moves upwardly in FIG. 19). The sleeves pass off the nipple towards the end of this movement.

A cylinder 149 and a piston 150 are pivoted at 151, 152 respectively, and during operation they pivot the arm 147 about 153 to index the wheel between the full line position and chain-dotted position of FIG. 18. fter the crank 147 has moved upwardly, shaft 140 is moved inwards behind the next nipple and a crank 147 is then lowered to bring the next nipple into truing position. During the indexing stroke the shaft 141 is moved inwardly. The truing and indexing mechanism could be operated from the main drive shaft any suitable mechanism, which would carry the cam 45 to locally depress the wheel rim. One suitable mechanism might be in the form of arms which actuate control valves operated by rollers.

What is claimed is:

1. A method of truing a newly built spoked wheel having a hub and rim, subsequent to fitting spokes to the wheel and loosely screwing nipples to the spokes at the wheel rim comprising the steps of securing the rim and hub in a concentric relationship, locally depressing the rim relative to the hub to a datum radius in the region of a nipple, tightening said nipple at least partially, and further locally depressing said rim relative to said hub in the region of each of said remaining nipples until all of said nipples are tightened as desired.

2. A method as claimed in claim 1, wherein said nipple is rotated to tighten said nipple on the spoke until said nipple engages the rim while the rim is locally depressed by a force applied in the region of said nipple, releasing the force and repeating the method for all other nipples around the wheel until each nipple has been tightened.

3. A method as claimed in claim 1, in which the nipples are tightened in angular sequence.

4. A method as claimed in claim 1, in which the nipples are rotated by bringing moving bands into engagement therewith.

5. A method as claimed in claim 4, in which the moving bands are disposed on opposite sides and in contact with the barrel of the nipple.

6. A method as claimed in claim 5, in which the bands are arranged to slip relative to the nipple after the nipple has been rotated into engagement with the rim.

7. A method as claimed in claim 1, in which the wheel is repeatedly indexed to bring the nipples sequentially into a position in which said nipples may be tightened.

8. A method as claimed in claim 1, wherein said step of locally depressing said rim relative to said hub in the region of each of said nipples is conducted at least twice, whereby said spokes do not become tensioned all at once to the desired amount.

9. A method as claimed in claim 1, in which every third nipple is tightened in a continual sequence until all the nipples are tightened.

10. A method as claimed in claim 1, in which every fifth nipple is tightened in a continual sequence until all the nipples are tightened.

* * * * *